United States Patent
Zhou et al.

(10) Patent No.: US 10,631,009 B2
(45) Date of Patent: Apr. 21, 2020

(54) METHOD BASED ON CODING TREE UNIT LEVEL RATE-DISTORTION OPTIMIZATION FOR RATE CONTROL IN VIDEO CODING

(71) Applicant: TFI Digital Media Limited, Hong Kong (HK)

(72) Inventors: Mingliang Zhou, Hong Kong (HK); Shiqi Wang, Hong Kong (HK); Sam Tak Wu Kwong, Hong Kong (HK); Chi Keung Fong, Hong Kong (HK); Hon Wah Wong, Hong Kong (HK); Hon Tung Luk, Hong Kong (HK); Hok Kwan Cheung, Hong Kong (HK); Yiu Fai Yuen, Hong Kong (HK)

(73) Assignee: TFI Digital Media Limited, Hong Kong (HK)

( * ) Notice: Subject to any disclaimer, the term of this patent is extended or adjusted under 35 U.S.C. 154(b) by 0 days.

(21) Appl. No.: 16/038,154

(22) Filed: Jul. 17, 2018

(65) Prior Publication Data
US 2020/0029093 A1    Jan. 23, 2020

(51) Int. Cl.
| | | |
|---|---|---|
| *H04N 19/625* | (2014.01) | |
| *H04N 19/19* | (2014.01) | |
| *H04N 19/96* | (2014.01) | |
| *H04N 19/176* | (2014.01) | |

(52) U.S. Cl.
CPC ......... *H04N 19/625* (2014.11); *H04N 19/176* (2014.11); *H04N 19/19* (2014.11); *H04N 19/96* (2014.11)

(58) Field of Classification Search
CPC .... H04N 19/176; H04N 19/98; H04N 19/103; H04N 19/147; H04N 19/186; H04N 19/19; H04N 19/30; H04N 19/46; H04N 19/50; H04N 19/51; H04N 19/52; H04N 19/593; H04N 19/96; H04N 19/625
USPC ...................................................... 375/240.2
See application file for complete search history.

(56) References Cited

U.S. PATENT DOCUMENTS

2016/0337668 A1* 11/2016 Le Leannec ......... H04N 19/176
2017/0171565 A1* 6/2017 Le Leannec ........... H04N 19/50

OTHER PUBLICATIONS

Gao et al. "SSIM-Based Game Theory Approach for Rate-Distortion Optimized Intra Frame CTU-Level Bit Allocation", IEEE Transactions on Multimedia, vol. 18, No. 6, Jun. 2016.*

(Continued)

*Primary Examiner* — Mohammed S Rahaman
(74) *Attorney, Agent, or Firm* — Idea Intellectual Limited; Margaret A. Burke; Sam T. Yip

(57) ABSTRACT

A method based on CTU level rate-distortion optimization for rate control in video coding which can effectively improve the perceptual rate-distortion performance and coding efficiency is provided. Firstly, a perceptual rate-distortion model is established using a divisive normalization framework, which characterizes the relationship between local visual quality and coding bits. Subsequently, the established perceptual rate-distortion model is applied to overall distortion optimization which is transformed into a global optimization problem and solved with convex optimization algorithms to obtain optimal CTU level coding bit allocation.

8 Claims, 16 Drawing Sheets

(56) References Cited

OTHER PUBLICATIONS

Wang, et al., "Lagrange multiplier based perceptual optimization for high efficiency video coding", Proc. Signal Inf. Process. Assoc. Annu. Summit Conf., pp. 1-4, 2014. (Wang), Process. Assoc. Annu. Summit Conf., 2014, pp. 1-4.*

Shiqi Wang et al. "Perceptual Video Coding Based on SSIM-Inspired Divisive Normalization" (Shiqi Wang), IEEE Trans. Image Process., vol. 22, No. 4, pp. 1418-1429, Apr. 2013.*

Rouis et al. Perceptually Adaptive Lagrangian Multiplier for HEVC Guided Rate-Distortion Optimization (equations 12 & 24), Jul. 6, 2018. Digital Object Identifier 10.1109/ACCESS.2018.2843384.*

H. Choi et. al., "Rate control based on unified RQ model for HEVC," Joint Collaborative Team on Video Coding (JCT-VC) of ITU-T SG16 WP3 and ISO/IEC JTC1/SC29/WG11, 2012, p. 1-13.

X. Liang et. al., "A novel R-Q model based rate control scheme in HEVC," 2013 Vis. Commun. Image Process. 2013, p. 1-6.

B. Li et. al., "Rate control by R-lambda model for HEVC," Joint Collaborative Team on Video Coding (JCT-VC) of ITU-T SG 16 WP 3 and ISO/IEC JTC 1/SC 29/WG 11, 2012, p. 1-11.

B. Lee et. al., "A frame-level rate control scheme based on texture and nontexture rate models for high efficiency video coding," IEEE Trans. on Circuits and Syst. for Video Technol., 2014, p. 465-479.

M. Karczewicz et. al., "Intra frame rate control based on SATD," Joint Collaborative Team on Video Coding (JCT-VC) of ITU-T SG 16 WP 3 and ISO/IEC JTC 1/SC 29/WG 11, 2013, p. 1-5.

B. Li et. al., "Adaptive bit allocation for R-lambda model rate control in HM," Joint Collaborative Team on Video Coding (JCT-VC) of ITU-T SG 16 WP 3 and ISO/IEC JTC 1/SC 29/WG 11, 2013, p. 1-7.

M. Wang et. al., "An efficient frame-content based intra frame rate control for high efficiency video coding," IEEE Signal Process. Lett., 2015, p. 896-900.

S. Li et. al., "Optimal bit allocation for CTU level rate control in HEVC," IEEE Trans. on Circuits and Syst. for Video Technol., 2017, p. 2409-2424.

M. Wang et. al., "Low-delay rate control for consistent quality using distortion-based Lagrange multiplier," IEEE Trans. on Image Process., 2016. p. 2943-2955.

M. Zhou et. al., "Complexity Correlation-Based CTU level Rate Control with Direction Selection for HEVC," ACM Trans-actions on Multimedia Computing, Communications, and Applications, 2017, p. 53:1-53:23.

W. Gao et. al., "Joint machine learning and game theory for rate control in high efficiency video coding," IEEE Transactions on Image Processing, 2017, p. 6074-6089.

* cited by examiner

CORRELATION COEFFICIENTS BETWEEN ACTUAL AND ESTIMATED VALUES
FOR DIFFERENT CTUS

| Sequence | CTU index=3 | CTU index=5 | CTU index=7 | CTU index=10 | Avg |
|---|---|---|---|---|---|
| PeopleOnstreet(1600p) | 0.9275 | 0.9865 | 0.9937 | 0.9916 | 0.9748 |
| ParkScene(1080p) | 0.9033 | 0.9477 | 0.9543 | 0.9689 | 0.9436 |
| FourPeople(720p) | 0.9126 | 0.9237 | 0.9379 | 0.9730 | 0.9368 |
| BQMall(832*480) | 0.9877 | 0.8194 | 0.9266 | 0.9301 | 0.9160 |
| BQsquare(416*240) | 0.9654 | 0.9538 | 0.9544 | 0.9466 | 0.9551 |
| Avg | 0.9393 | 0.9262 | 0.9534 | 0.9620 | 0.9452 |

FIG. 2

RD PERFORMANCE COMPARISON WITH DIFFERENT RC METHODS
(NON-HIERARCHICAL)

| Sequence | Ours vs. HM16.8 | | Ours vs. Li et al. [16] | | Ours vs. Wang et al. [17] | | Ours vs. Gao et al. [18] | |
|---|---|---|---|---|---|---|---|---|
| | BD-Rate (%) | BD-SSIM | BD-Rate (%) | BD-SSIM | BD-Rate (%) | BD-SSIM | BD-Rate (%) | BD-SSIM |
| Class A | -12.7 | 0.006999 | -12.3 | 0.006747 | -9.2 | 0.004932 | -8.4 | 0.004681 |
| Class B | -14.7 | 0.007845 | -10.3 | 0.006601 | -7.3 | 0.004377 | -6.3 | 0.003612 |
| Class C | -17.1 | 0.011762 | -11.7 | 0.006722 | -8.7 | 0.004688 | -7.6 | 0.004385 |
| Class D | -26.9 | 0.018937 | -18.2 | 0.012788 | -13.7 | 0.007577 | -12.3 | 0.006940 |
| Class E | -10.4 | 0.006608 | -10.1 | 0.005998 | -7.1 | 0.004176 | -6.1 | 0.003472 |
| Average | -16.3 | 0.010370 | -12.5 | 0.007771 | -9.2 | 0.005150 | -8.1 | 0.004618 |

FIG. 6A

RD PERFORMANCE COMPARISON WITH DIFFERENT RC METHODS
(HIERARCHICAL)

| Sequence | Ours vs. HM 16.8 | | Ours vs. Li et al. [16] | | Ours vs. Wang et al. [17] | | Ours vs. Gao et al. [18] | |
|---|---|---|---|---|---|---|---|---|
| | BD-Rate (%) | BD SSIM | BD-Rate (%) | BD SSIM | BD-Rate (%) | BD SSIM | BD-Rate (%) | BD SSIM |
| Class A | -5.9 | 0.003077 | -5.8 | 0.002933 | -3.6 | 0.002033 | -3.3 | 0.001996 |
| Class B | -4.3 | 0.002550 | -4.5 | 0.002588 | -2.9 | 0.001922 | -2.7 | 0.001877 |
| Class C | -4.8 | 0.002706 | -5.5 | 0.002789 | -3.7 | 0.002077 | -3.5 | 0.001911 |
| Class D | -12.1 | 0.006937 | -8.0 | 0.004477 | -6.2 | 0.003487 | -5.9 | 0.003015 |
| Class E | -5.2 | 0.002799 | -5.1 | 0.002786 | -3.1 | 0.001978 | -2.9 | 0.001926 |
| Average | -6.5 | 0.003614 | -5.8 | 0.003115 | -3.9 | 0.002299 | -3.7 | 0.002145 |

FIG. 6B

COMPARISON OF S_SSIM UNDER DIFFERENT METHODS

| Sequence | HM 16.8 | | Li et al.[16] | | Wang et al.[17] | | Gao et al.[18] | | Ours | |
|---|---|---|---|---|---|---|---|---|---|---|
| | N-Hie | Hie | N-Hie | Hie | N-Hie | Hie | N-Hie | Hie | N-Hie | Hie |
| Class A | 0.0105 | 0.0116 | 0.0122 | 0.0133 | 0.0092 | 0.0103 | 0.0081 | 0.0096 | 0.0064 | 0.0074 |
| Class B | 0.0043 | 0.0052 | 0.0086 | 0.0094 | 0.0041 | 0.0047 | 0.0035 | 0.0039 | 0.0019 | 0.0021 |
| Class C | 0.0143 | 0.0164 | 0.0177 | 0.0188 | 0.0126 | 0.0132 | 0.0087 | 0.0099 | 0.0058 | 0.0065 |
| Class D | 0.0145 | 0.0166 | 0.0178 | 0.0189 | 0.0127 | 0.0129 | 0.0089 | 0.0108 | 0.0061 | 0.0093 |
| Class E | 0.0033 | 0.0043 | 0.0067 | 0.0099 | 0.0032 | 0.0040 | 0.0016 | 0.0020 | 0.0009 | 0.0011 |
| Average | 0.0094 | 0.0108 | 0.0126 | 0.0140 | 0.0084 | 0.0090 | 0.0062 | 0.0072 | 0.0042 | 0.0053 |

FIG. 9

FRAME LEVEL RC ACCURACY COMPARISONS

| Sequence | HM 16.8 | | Li et al.[16] | | Wang et al.[17] | | Gao et al.[18] | | Ours | |
|---|---|---|---|---|---|---|---|---|---|---|
| | N-Hie | Hie | N-Hie | Hie | N-Hie | Hie | N-Hie | Hie | N-Hie | Hie |
| Class A | 0.21 | 1.16 | 0.18 | 1.03 | 1.98 | 9.77 | 0.41 | 2.15 | 0.38 | 2.09 |
| Class B | 0.53 | 2.53 | 0.49 | 1.98 | 1.77 | 5.01 | 0.72 | 3.07 | 0.56 | 2.98 |
| Class C | 0.31 | 1.52 | 0.26 | 1.32 | 1.86 | 9.63 | 0.09 | 1.18 | 0.30 | 1.33 |
| Class D | 0.54 | 2.56 | 0.47 | 2.44 | 3.22 | 10.11 | 0.69 | 3.17 | 0.58 | 2.99 |
| Class E | 1.47 | 6.83 | 1.43 | 5.37 | 0.98 | 3.67 | 1.78 | 5.09 | 1.68 | 4.94 |
| Average | 0.61 | 2.92 | 0.57 | 2.42 | 1.96 | 7.64 | 0.74 | 2.93 | 0.70 | 2.87 |

RD PERFORMANCE COMPARISON FOR
SCENE CHANGE SEQUENCES(HIERARCHICAL)

| Sequence | Ours vs. HM16.8 | | Ours vs. Li et al.[16] | | Ours vs. Wang et al.[17] | | Ours vs. Gao et al.[18] | |
|---|---|---|---|---|---|---|---|---|
| | BD-Rate (%) | BD-SSIM | BD-Rate (%) | BD-SSIM | BD-Rate (%) | BD-SSIM | BD-Rate (%) | BD-SSIM |
| Mobisode (416x240) | -4.6 | 0.002610 | -2.9 | 0.001925 | -4.1 | 0.002490 | -2.8 | 0.001901 |
| Kimono (1080p) | -3.3 | 0.001994 | -1.1 | 0.000977 | -2.9 | 0.001921 | -1.8 | 0.001366 |
| Tennis (1080p) | -4.0 | 0.002377 | -2.5 | 0.001867 | -4.6 | 0.002607 | -2.6 | 0.001879 |
| Average | -4.0 | 0.002327 | -2.2 | 0.001590 | -3.9 | 0.002339 | -2.4 | 0.001715 |

FIG. 13

FRAME LEVEL RC ACCURACY COMPARISONS FOR
SCENE CHANGE SEQUENCES(HIERARCHICAL)

| Sequence | HM 16.8 | Li et al. [16] | Wang et al. [17] | Gao et al. [18] | Ours |
|---|---|---|---|---|---|
| Mobisode (416x240) | 2.78 | 1.78 | 4.46 | 2.02 | 1.81 |
| Kimono (1080p) | 1.39 | 1.26 | 3.12 | 1.35 | 1.31 |
| Tennis (1080p) | 2.99 | 2.31 | 4.89 | 2.45 | 2.29 |
| Average | 2.39 | 1.78 | 4.16 | 1.94 | 1.80 |

METHOD BASED ON CODING TREE UNIT LEVEL RATE-DISTORTION OPTIMIZATION FOR RATE CONTROL IN VIDEO CODING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to rate control in video coding. Particularly, the present invention relates to coding tree unit level rate-distortion optimization for rate control in video coding.

BACKGROUND

Recently, several studies have been conducted to improve rate control (RC) optimization in High Efficiency Video Coding (HEVC). There are three categories of RC algorithms for HEVC: quadratic model [1], $\rho$-domain model [2] and R-$\lambda$, model. More specifically, Li et al. [3] first proposed the $\lambda$ domain RC based on the relationship between coding bits and the Lagrangian multiplier. Due to the low complexity and high efficiency, the R-$\lambda$, model has been adopted in HEVC reference software as the default RC algorithm. Lee et al. investigated the Laplacian probability distribution function (PDF) in [4] to model the residue and proposed independent R-Q models to establish the relationship between the quantization parameters and coding bits, including texture and non-texture bits. Moreover, intra frame RC algorithms have also been studied. Li et al. [5] proposed an adaptive bit allocation algorithm to improve the R-$\lambda$, model RC algorithm on intra frame. In [6], sum of absolute transformed differences (SATD) was used to measure the complexity for intra-frame, which further improves the performance. Wang et al. proposed an intra R-$\lambda$, model in [7], and the gradient was used to characterize the picture complexity.

In FIG. 15, the basic process of RC in HEVC is illustrated. Coding tree unit (CTU) level RC is also playing an important role in regulating the bit rate and improving the coding performance. Due to the importance of CTU-level RC, which can greatly influence the Rate-Distortion (R-D) performances, various RC algorithms at CTU level have been proposed for HEVC. An optimized CTU level RC strategy was proposed by Li et al. [8]. Wang et al. [9] proposed a RC scheme based on Lagrange multiplier, which greatly improved the coding efficiency. In [10], Zhou et al. proposed a novel CTU level RC method based on content complexity correlation for HEVC. However, these methods are optimized based on mean square error (MSE), which may not be optimal in terms of perceptual quality. As the ultimate receiver of the video streams is the human visual system [11], it is desirable to have a RC scheme where the perceptual characteristics are fully considered in CTU level bit allocation.

REFERENCES

[1] H. Choi, J. Nam, J. Yoo, D. Sim, and I. Bajic, "Rate control based on unified RQ model for HEVC," in Joint Collaborative Team on Video Coding (JCT-VC) of ITU-T SG16 WP3 and ISO/IECJTC1/SC29/WG118th Meeting, 2012, pp. 1-10.

[2] X. Liang, Q. Wang, Y. Zhou, B. Luo, and A. Men, "A novel R-Q model based rate control scheme in HEVC," in Vis. Commun. Image Process. Kuching, 2013, pp. 1-6.

[3] B. Li, H. Li, L. Li, and J. Zhang, "Rate control by R-$\lambda$, model for HEVC," in ITU-T SG16 Contribution, JCTVC-K0103, Shanghai, 2013, pp. 1-5.

[4] B. Lee, M. Kim, and T. Q. Nguyen, "A frame-level rate control scheme based on texture and nontexture rate models for high efficiency video coding," IEEE Trans. Circuits Syst. Video Technol., vol. 24, no. 3, pp. 465-479, March 2014.

[5] X. Wang, M. Karczewicz, "Intra frame rate control based on SATD," Document: JCTVC-M0257, Joint Collaborative Team on Video Coding.

[6] B. Li, H. Li, L. Li, "Adaptive bit allocation for R-$\lambda$, model rate control in HM," Document: JCTVC-M0036, Joint Collaborative Team on Video Coding.

[7] M. Wang, K. N. Ngan, and H. Li, "An efficient frame-content based intra frame rate control for high efficiency video coding," IEEE Signal Process. Lett. vol. 22, no. 7, pp. 896-900, July 2015.

[8] S. Li, M. Xu, Z. Wang, and X. Sun, "Optimal bit allocation for CTU level rate control in HEVC," IEEE Trans. Circuits Syst. Video Technol., vol. PP, no. 99, p. 1, July 2016.

[9] M. Wang, K. N. Ngan, and H. Li, "Low-delay rate control for consistent quality using distortion-based Lagrange multiplier," IEEE Trans. Image Process., vol. 25, no. 7, pp. 2943-2955, April 2016.

[10] M. Zhou, Y. Zhang, B. Li, and X. Lin, "Complexity Correlation-Based CTU level Rate Control with Direction Selection for HEVC," ACM Transactions on Multimedia Computing, Communications, and Applications, Volume 13, Issue 4, August 2017, pp. 1-23.

[11] W. Gao, S. Kwong, and Y. Jia, "Joint machine learning and game theory for rate control in high efficiency video coding," IEEE Transactions on Image Processing, vol. 26, no. 12, pp. 6074-6089, 2017.

The disclosures of above references are incorporated herein by reference in their entirety.

SUMMARY OF THE INVENTION

The present disclosure relates to methods based on coding tree unit (CTU) level rate-distortion (R-D) optimization for rate control (RC) in video coding which can effectively improve the perceptual rate-distortion performance and coding efficiency. Firstly, a perceptual R-D model is established using a divisive normalization framework, which characterizes the relationship between local visual quality and coding bits. Subsequently, the established perceptual R-D model is applied to overall distortion optimization which is transformed into a global optimization problem and solved with convex optimization algorithms to obtain optimal CTU level coding bit allocation.

BRIEF DESCRIPTION OF THE DRAWINGS

Embodiments of the invention are described in more detail hereinafter with reference to the drawings, in which:

FIG. 2 shows a table of Pearson correlation coefficients between the predicted and actual values for different coding tree units (CTUs) according to one embodiment of the present invention;

FIGS. 3A-3F show the actual and fitted relationships between rate and perceptual distortion for several typical test sequences with different quantization parameters according to one embodiment of the present invention; wherein FIG. 3A shows the actual and fitted relationships for the sequence PeopleOnstreet, FIG. 3B shows the actual and fitted relationships for the sequence PartyScene, FIG. 3C shows the actual and fitted relationships for the sequence Johnny, FIG. 3D shows the actual and fitted relationships for the sequence ParkScene, FIG. 3E shows the actual and fitted relationships for the sequence Keiba and FIG. 3F shows the actual and fitted relationships for the sequence BlowingBubbles;

FIGS. 4A-4C show comparisons between the actual and estimated values of model parameters according to one embodiment of the present invention; wherein FIG. 4A shows the comparison for the 60-th frame in BQMall(832×480) sequence; FIG. 4B shows the comparison for the 96-th frame in Keiba(832×480) sequence; and FIG. 4B shows the comparison for the 200-th frame in Johnny(720p) sequence;

FIGS. 5A-5D show the overall rate-SSIM performance of the method of the present invention comparing with some state-of-the-art methods; wherein FIG. 5A shows the comparison with HM16.8, FIG. 5B shows the comparison with Li et al. [8], FIG. 5C shows the comparison with Wang et al. [9] and FIG. 5D shows the comparison with GAO et al. [11];

FIGS. 6A-6B show two tables of the bit rate savings of the method of the present invention comparing with some state-of-the-art methods under non-hierarchical and hierarchical configurations, respectively; wherein FIG. 6A shows the comparison under non-hierarchical configuration and FIG. 6B shows the son under hierarchical configuration;

FIGS. 7A-7F show comparison results of visual qualities of frames encoded from 120-th frame in BQSquare sequence with target bit rate of 160 kbps by the method of the present invention and some state-of-the-art RC methods under hierarchical configuration; wherein FIG. 7A shows the original frame; FIG. 7B shows a frame encoded with the method of HM16.8 at actual bit rate of 161.11 kbps; FIG. 7C shows a frame encoded with the method of Li et al. [8] at actual bit rate of 160.77 kbps; FIG. 7D shows a frame encoded with the method of Wang et al. [9] at actual bit rate of 163.77 kbps; FIG. 7E shows a frame encoded with the method of Gao et al. [11] at actual bit rate of 161.72 kbps, respectively; and FIG. 7F shows a frame encoded with the method of the present invention at actual bit rate of 160.83 kbps;

FIGS. 8A-8F show other comparison results of visual qualities of frames encoded from the 120-th frame in BQSquare sequence with target bit rate of 780 kbps by the method of the present invention and some state-of-the-art RC methods under hierarchical configuration; wherein FIG. 8A shows the original framed; FIG. 8B shows a frame encoded with the method of HM16.8 at actual bit rate of 780.33 kbps; FIG. 8C shows a frame encoded with the method of Li et al. [8] at actual bit rate of 780.11 kbps; FIG. 8D shows a frame encoded with the method of Wang et al. [9] at actual bit rate of 781.34 kbps; FIG. 8E shows a frame encoded with the method of Gao et al. [11] at actual bit rate of 780.95 kbps; and FIG. 8F shows a frame encoded with the method of the present invention at actual bit rate of 780.17 kbps;

FIG. 9 shows a table of experimental results comparing the quality smoothness among the method of the present invention and some state-of-the-art RC methods under non-hierarchical (N-Hie) and hierarchical (Hie) configurations, respectively;

FIGS. 10A-10B show typical buffer occupancies for two test video sequences under hierarchical configuration; wherein FIG. 10A shows the buffer occupancy for the video sequence Catus (1080p) and FIG. 10B shows the buffer occupancy for the video sequence Keiba (832×480);

FIG. 13 shows a table of R-D performance comparison among the method of the present invention and some state-of-the-art RC methods under hierarchical configuration on video sequences with dynamic scene changes; and FIG. 14 shows a table of frame level RC accuracy comparison among the method of the present invention and some state-of-the-art RC methods under hierarchical configuration on video sequences with dynamic scene changes.

DETAILED DESCRIPTION

In the following description, methods and apparatus using coding tree unit (CTU) level rate-distortion optimization for rate control (RC) in video coding are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
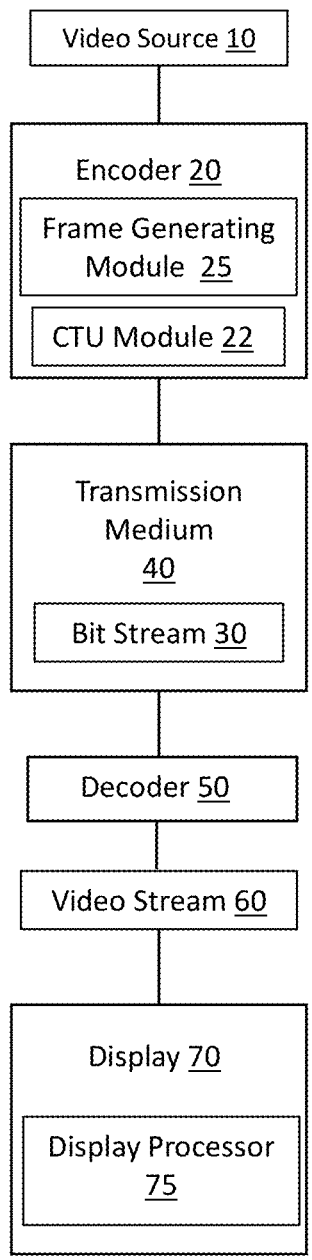
FIG. 1 shows a block diagram of a video coding system according to one embodiment of the present invention.
Figure 3A:
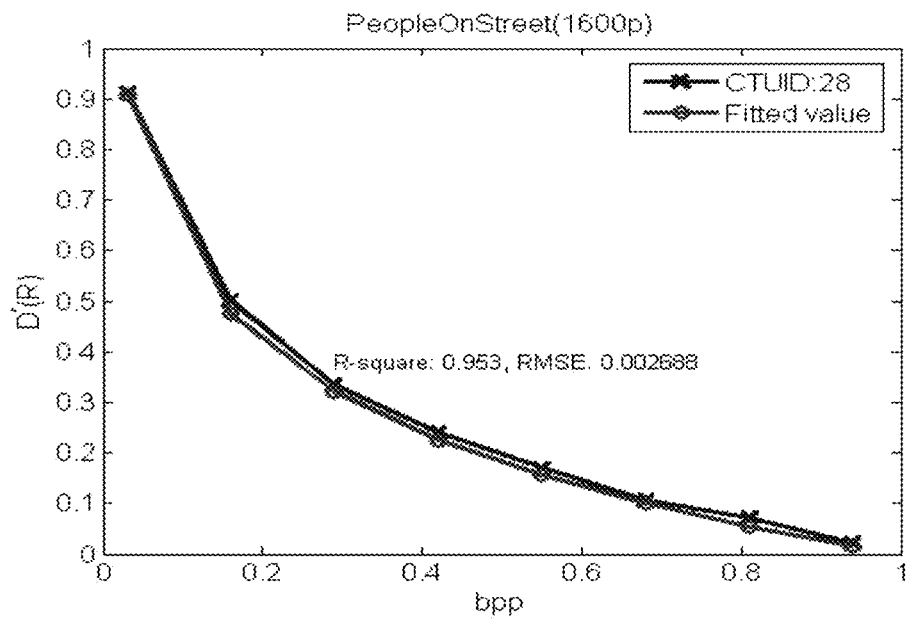
Figure 3B:
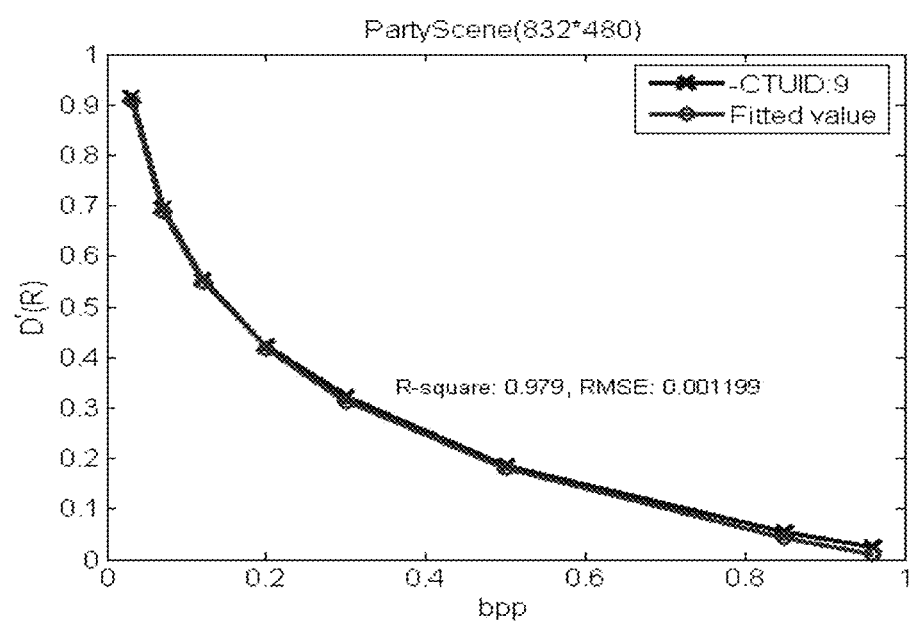
Figure 3C:
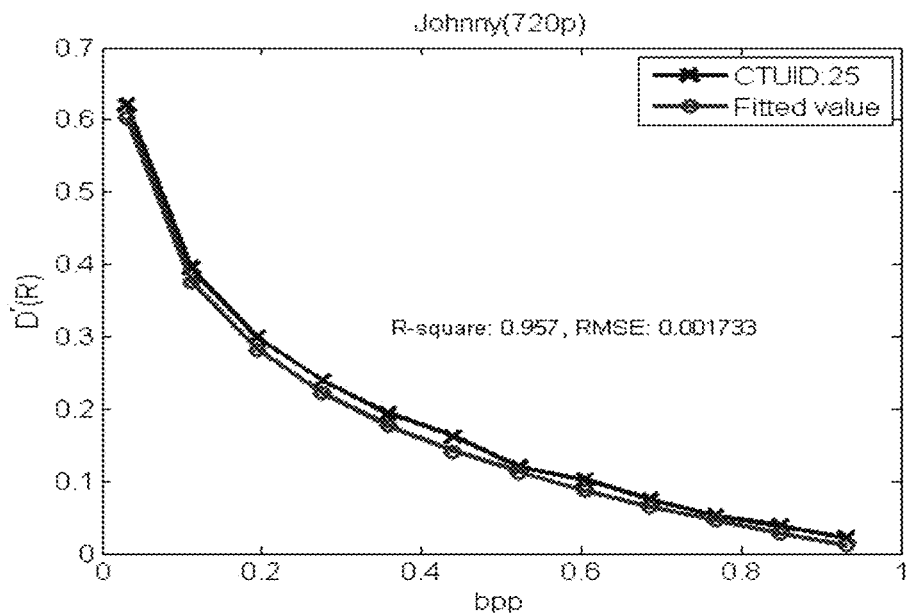
Figure 3D:
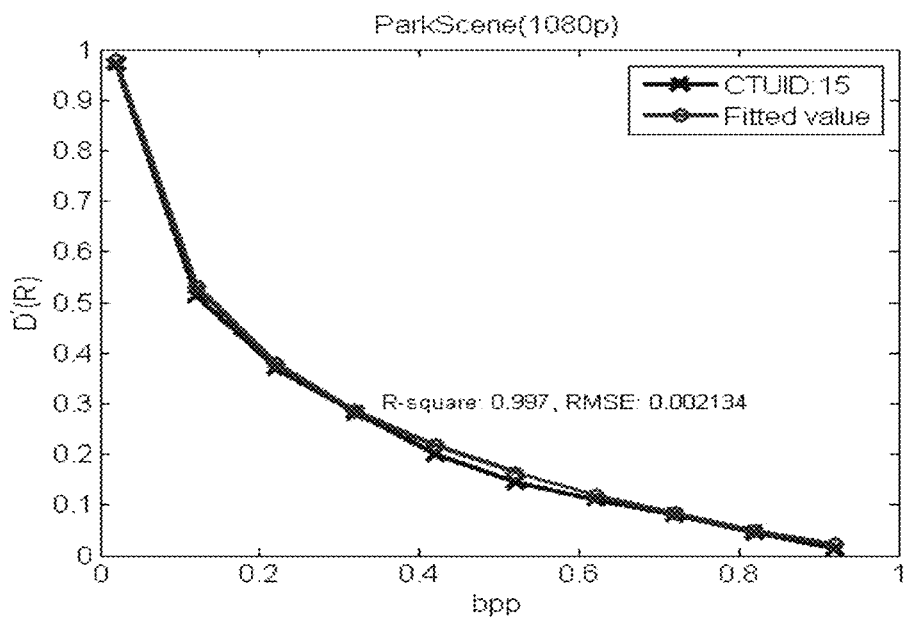
Figure 3E:
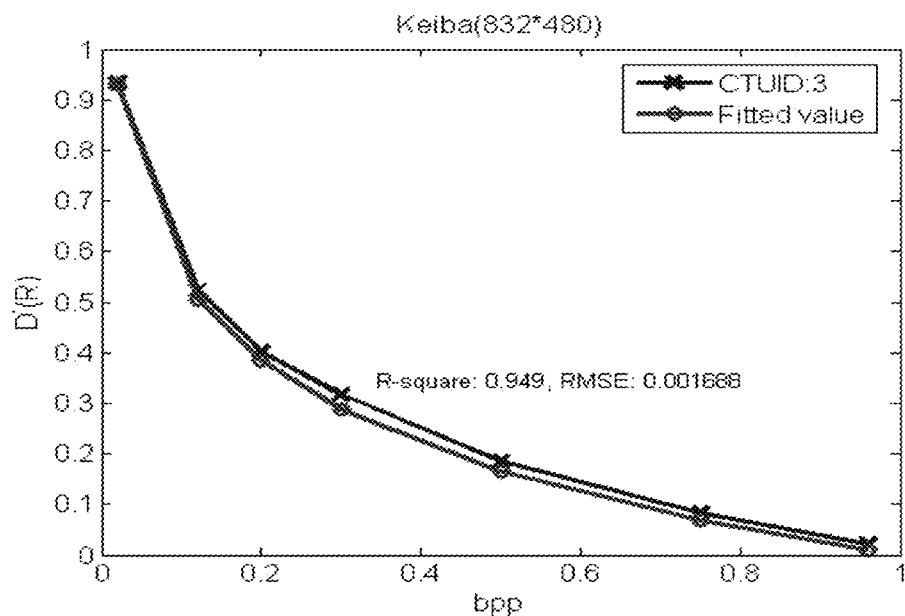
Figure 3F:
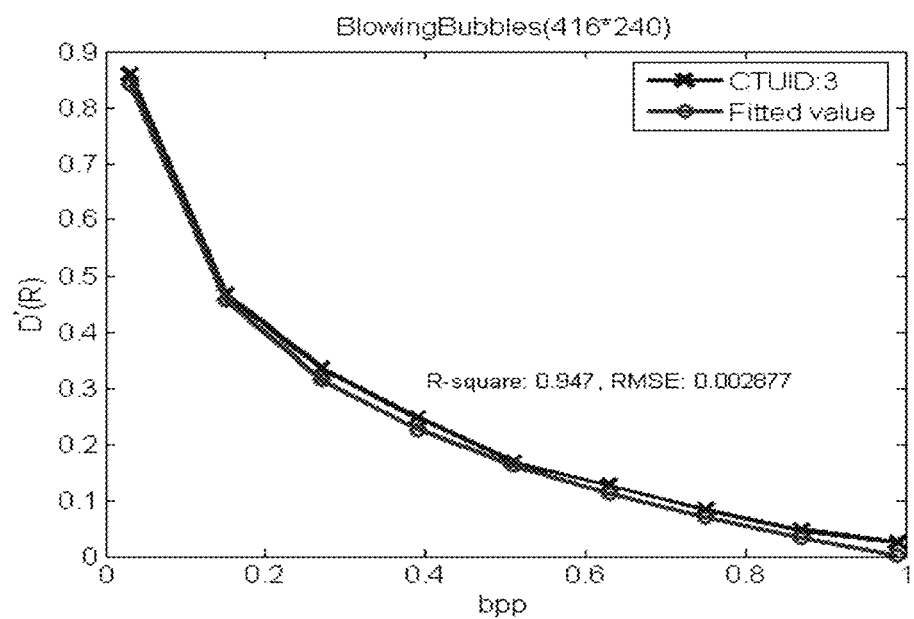

In one aspect, the present invention may be implemented in the video coding system 100 of FIG. 1. The system 100 may include modules. The term "module" may include software, hardware, or a combination thereof in which software can be machine code, firmware, embedded code, and application software. The hardware may be circuitry, processors, computers, integrated circuits, integrated circuit cores, passive devices, or a combination thereof. In FIG. 1, a video encoder 20 may receive and encode video from a video source 10. "Video" as used herein, is a digital representation of one or more objects.

Encoding is defined as computationally modifying a video source 10 to a different form. Encoding includes compression, in which data amounts are reduced, enhancement, resolution changes, aspect ratio changes. In one aspect, the encoding may be performed according to the High-Efficiency Video Coding (HEVC)/H.265 standard. Frames are generated in a frame generating module 25. Subsequently, the frame may be divided into one or more CTUs in CTU module 22.

Video encoded by the encoder 20 forms a video bitstream 30 that represents information from the video source 10. The video bitstream 30 is transmitted or transferred to decoder 50 over transmission medium 40.

Transmission medium 40 may be a wired or wireless communication network or a file transfer to decoder 50.

Decoder 50 takes the video bitstream 30 and creates a video stream 60, which is a computationally modified version of the video source 10. The decoder may create a video stream 60 that can have different properties from the source such as a different frame rate, different resolution, different color parameters, different view order, different aspect ratio, a different frame rate, or combinations, etc.

The video stream 60 is transmitted to a display medium 70 including a display processor 75. The display processor 75 can receive the video stream 60 from the video decoder 50 for display by the display medium 70.

The video coding system 100 can employ a variety of video coding syntax structures. For example, the video coding system 100 can encode and decode video information using High Efficiency Video Coding/H.265 (HEVC), scalable extensions for HEVC (SHVC), or other video coding syntax structures.

The video encoder 20 and the video decoder 50 may be implemented by hardware, software, or a combination thereof. For example, the video encoder 50 may be implemented with custom circuitry, a digital signal processor, microprocessor, or a combination thereof. In another example, the video decoder 60 can be implemented with custom circuitry, a digital signal processor, microprocessor, or a combination thereof.

According to one embodiment of the present invention, a method based on CTU level rate-distortion optimization for RC in video coding is provided. The method may be implemented in the system of FIG. 1. The method comprises: receiving an input video; dividing a frame of the input video into one or more CTUs; determining coding bits of the one or more CTU level through optimizing rate-distortion (R-D) performance based on a divisive normalization framework; wherein the divisive normalization framework is configured to characterize the perceptual distortion for each CTU in relation with the mean square error (MSE) distortion and a divisive normalized factor f by the equation:

$$D'(R)=D(R)/f^2 \quad (1)$$

where $D(R)$ is the MSE distortion, $D'(R)$ is the normalized perceptual distortion, and R is the bit rate of CTU. In general, the MSE distortion, $D(R)$, may be defined by:

$$MSE = \frac{1}{mn}\sum_{i=0}^{m-1}\sum_{j=0}^{n-1}\|I(i,j) - K(i,j)\|^2 \quad (2)$$

where I and k are original frame and reconstructed frame, respectively. $I(i,j)$ and $K(i,j)$ are the pixel values of original frame and reconstructed frame, respectively. m and n are the numbers of rows and columns in a frame, respectively.

To obtain the divisive normalization factor f, each CTU can be divided into l sub-blocks for Direct Cosine Transform (DCT), and the factor f is obtained from the Structural Similarity (SSIM) index in DCT domain:

$$f = \frac{\frac{1}{l}\sum_{i=1}^{l}\sqrt{\frac{\sum_{j=1}^{N_L-1}(U_i(j)^2 + V_i(j)^2)}{N_L - 1} + C_1}}{E\left(\sqrt{\frac{\sum_{j=1}^{N_L-1}(U(j)^2 + V(j)^2)}{N_L - 1} + C_1}\right)} \quad (3)$$

where $E(\ )$ is the expectation operation in the whole frame. $U(j)$ and $V(j)$ denote the DCT coefficients of the input and reconstructed signals, $U_i(j)$ and $V_i(j)$ are the corresponding j-th DCT coefficient in the i-th sub-block.

In some embodiments, the DCT coefficients of the reconstructed signals are approximated by the original input signals as the frame has not been encoded when deriving the normalization factors. $C_1$ is the constant in accordance with the definition of SSIM index. $N_L$ is the sub-block size, and may be set to be 16. However, it should be understood by those skilled in the art that the sub-block size can be set to any other values for deriving the divisive normalization factors f.

Given the available bit rate allocated to the frame, the CTU level rate control may be achieved by CTU level bit allocation through optimizing the perceptual distortion by minimizing a perceptual rate distortion cost function J defined by:

$$J = \sum_{i=1}^{N} D'(R_i) + \lambda R_i \quad (4)$$

where $\lambda$ is the Lagrangian multiplier in HEVC, which is also used when the distortion is normalized with the divisive normalization strategy, $D'(R_i)$ is the perceptual distortion of the i-th CTU with a coding bit rate $R_i$, and N is the number of CTU in one frame.

In some embodiments, a global optimization approach for optimizing the CTU level coding bit allocation may be used, wherein all CTUs in a frame are configured to compete for the resources under the constraint of the target frame-level coding bits. Therefore, the CTU level coding bits allocation can be performed effectively by solving an optimization problem. The scheme of the present invention not only improves the reconstruction quality and coding efficiency in terms of perceptual rate-distortion, but also benefits the future R-D modelling with high accuracy.

In the global optimization approach, each CTUs of a frame, denoted as $CTU_1$, $CTU_2$, ..., $CTU_N$, may be allocated with utilities of coding bit rates, $R_1$, $R_2$, ..., $R_N$ respectively. Possible utility combination sets may be expressed with a utility vector denoted as $U_m=(R_1^m, R_2^m, ..., R_N^m)$, $m \in [0,M]$ where M is the quantity of the possible combinations of utility.

As the utility set $U=(U_1, U_2, ..., U_M)$ is non-empty and bounded, and the set of feasible utility U is convex, the CTU level rate control can be achieved by an optimal bit rate allocation. The optimal bit allocation may be investigated by minimizing average distortion which depends on the perceptual distortion $D'(R_i)$. As such, the CTU level bit allocation may be formulated as:

$$\{R_1^*, R_2^*, ..., R_N^*\} = \arg\min \sum_{i=1}^{N} D'(R_i) \quad (5)$$

$$\text{s.t.} \sum_{i=1}^{N} R_i \le R_c$$

where N is the number of CTUs of one frame and $R_c$ is the frame-level bit rate.

Therefore, the perceptual distortion optimization problem can be converted from a constrained optimization problem into an unconstrained optimization problem and the cost function J of Equation (4) may be converted to:

$$J = \sum_{i=1}^{N} D'(R_i) + \lambda \left( R_C - \sum_{i=1}^{N} R_i \right) \quad (6)$$

Typically, Equation (6) is the minimal value of different function and convex function on convex set. Therefore, Karush-Kuhn-Tucker (KKT) condition ensures that the local optimal solution of Equation (6) is a KKT point and the local optimal solution is also the global optimal solution.

Taking the video content into consideration, the relationship between the normalized perceptual distortion D'(R) and the bit rate R may be depicted with a logarithmic R-D model:

$$D'(R) = \ln(c \times R^{-k}) \quad (7)$$

where c and k are model parameters depending on the video content.

The prediction accuracy of the logarithmic R-D model may be validated by calculating the average Pearson correlation coefficient between the predicted and actual values for a series of test sequences with different QPs including: PeopleOnstreet (1600p), ParkScene (1080p), FourPeople (720p), BQMall(832×480) and BQsquare(416×240). It can be seen from a table in FIG. 2 that the average Pearson correlation coefficient between the predicted and actual values using the model of the present invention are around 0.94.

The effectiveness of the logarithmic R-D model is also validated using a Low Delay B (LDB) coding structure with reference image in HM 16.8. The values of c and k are obtained by fitting the actual values with the model. FIGS. 3A-3F show the actual and fitted relationships between rate and perceptual distortion for several typical test sequences with different QPs including: PeopleOnstreet, PartyScene, Johnny, ParkScene, Keiba and BlowingBubbles. Again, it can be seen that the prediction accuracy is high for all sequences under test.

Based on the logarithmic R-D model, the optimal coding bit for each CTU may be obtained by solving the equation:

$$\begin{cases} \dfrac{\partial J}{\partial R_j} = -k_j \dfrac{1}{R_j} - \lambda = 0, \\ R_c - \sum_{i=1}^{N} R_i = 0 \end{cases} \quad (8)$$

where $R_k$ and $k_j$ are the coding bit and model parameter for the j-th CTU, respectively.

Given Eq. (8), we have, $$\sum_{i=1}^{N} \frac{-k_i}{\lambda} = R_c. \quad (9)$$

Then the following relationship can be derived by $$\lambda = \frac{\sum_{i=1}^{N} -k_i}{R_c}. \quad (10)$$

Subsequently, by substituting Equation (10) into Equation (8), we have $$\frac{\sum_{i=1}^{N} -k_i}{R_c} = \frac{-k_j}{R_j} \quad (11)$$

Accordingly, the optimal coding bits of the j-th CTU, denoted as $R_j^*$ $R_j$, may be 1-determined by $$R_j = \frac{k_j}{\sum_{i=1}^{N} k_i} R_c \quad (12)$$

After obtaining the parameter $k_j$ and $R_j^*$ for the j-th CTU of the current to-be-encoded i-th frame, the CTU level target bit budget $R_j^*$ may be further adjusted by:

$$R_j^* = R_j \times \omega_a \quad (13)$$

$$\omega_a = \left( 1 - \frac{\sum_{p=1}^{j-1} (R_{act,p} - R_p^*)}{R_c} \right)$$

where $\omega_a$ is an adjustment term to regularize the CTU level bit such that the frame-level budget can be met. $R_{act,p}$ and $R_p^*$ are the real bits and the target bits after bit allocation, respectively. The corresponding QP can be obtained for each CTU through the R-Q model disclosed in [1].

In some embodiments, optimal values of the parameter k for each CTU in a current to-be-encoded i-th frame may be estimated with an updating strategy based on the coding statistics of a previously encoded (i-1)th frame. In particular, the optimal value of k for a j-th CTU in the i-th frame may be obtained by minimizing the difference between a true distortion $D_{real}$ of the j-th CTU in the previously encoded i-1 frame and an estimated distortion $D_{comp}$ for the j-th CTU of the i-th frame.

The true distortion $D_{real}$ may be estimated with Equation (1): D'(R)=D(R)/f². The distortion between two adjacent frames is of great importance to control the consistent quality and the distortion of the current CTU is similar to the co-located position of previous frame. Therefore, the distortion of a co-located CTU may be used to obtain $D_{comp}$.

The difference between $D_{real}$ and $D_{comp}$ can be represented by a squared error function denoted as $e^2$ which is expressed as:

$$e^2 = (D_{real} - D_{comp})^2 \quad (14)$$

By taking the derivative of $e^2$ to k, we have $$\frac{\partial e^2}{\partial k} = \frac{\partial e^2}{\partial D_{comp}} \frac{\partial D_{comp}}{\partial k} = -2(D_{real} - D_{comp}) \ln R. \quad (15)$$

Based on the Taylor's expansion, the optimal value of k for the j-th CTU the i-th frame, $k_{new}$, may be obtained by:

$$k_{new} = k_{old} - \delta(-2(D_{real} - D_{comp})) \ln R$$

$$= k_{old} + \delta_k (D_{real} - D_{comp}) \ln R. \quad (16)$$

where $\delta_k$ is set to be 0.05, $k_{old}$ is the value of k of the co-located CTU in the previous frame, and R is the bit rate for the to-be-encoded CTU.

It should be noted that $\delta_k$ in Equation (16) can be adaptive to the video content and the model parameters between two consecutive frames are of great importance to achieve quality control in video coding. Regarding the rate control that produces videos with consistent quality, the model parameters of a CTU are better to be consistent with the co-located CTU in the previous frame. Therefore, the value of k of the co-located CTU in the previous frame may be used as $k_{old}$ Equation (16) for computing $k_{new}$. As to the initial values of k, it may be set to an arbitrary value such as 2.5 used in the experiment. It is also worth mentioning that the initial values of k are not critical for CTU level rate control in the present invention, as the value will keep updating in the actual coding process.

Figure 4A:
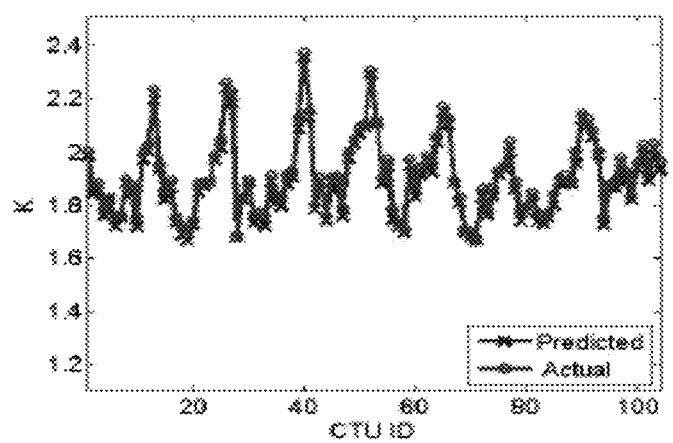
Figure 4B:
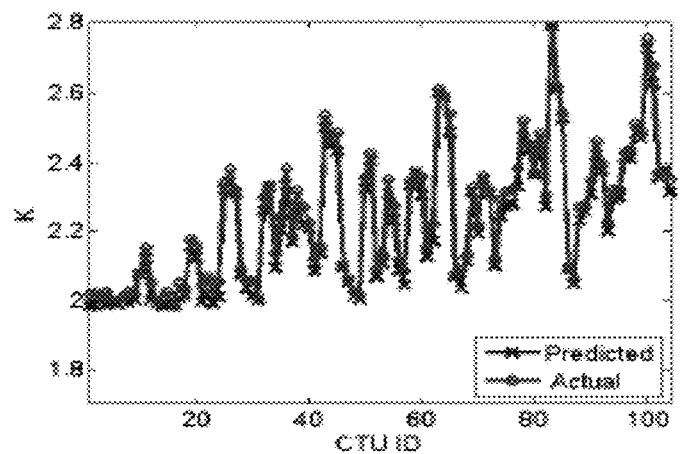
Figure 4C:
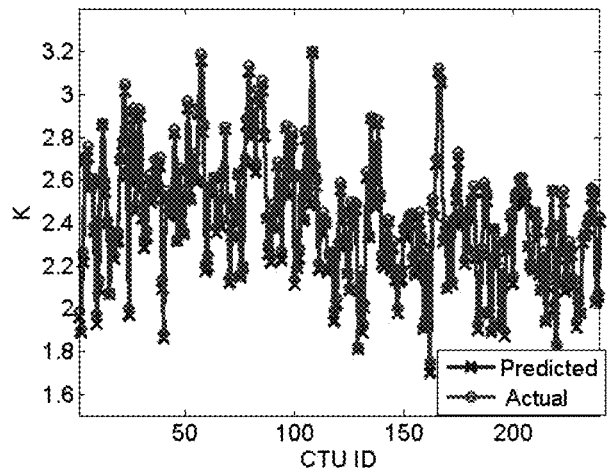
Figure 5A:
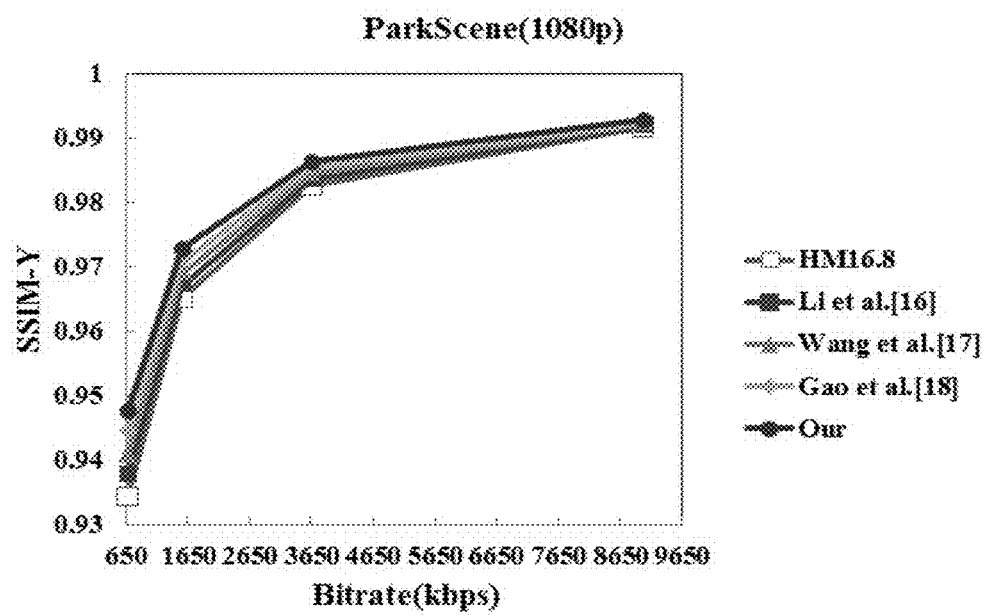
Figure 5B:
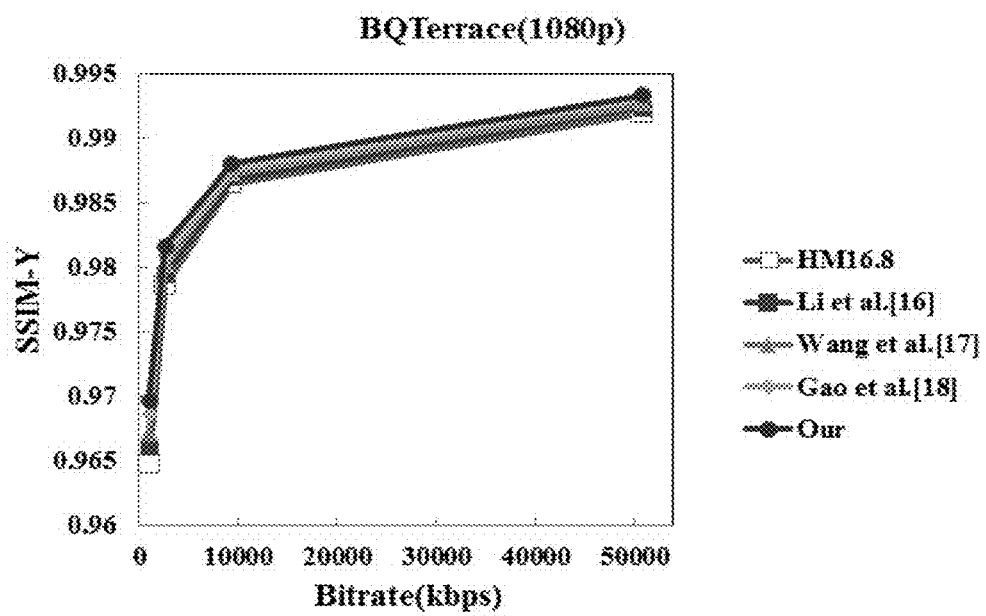
Figure 5C:
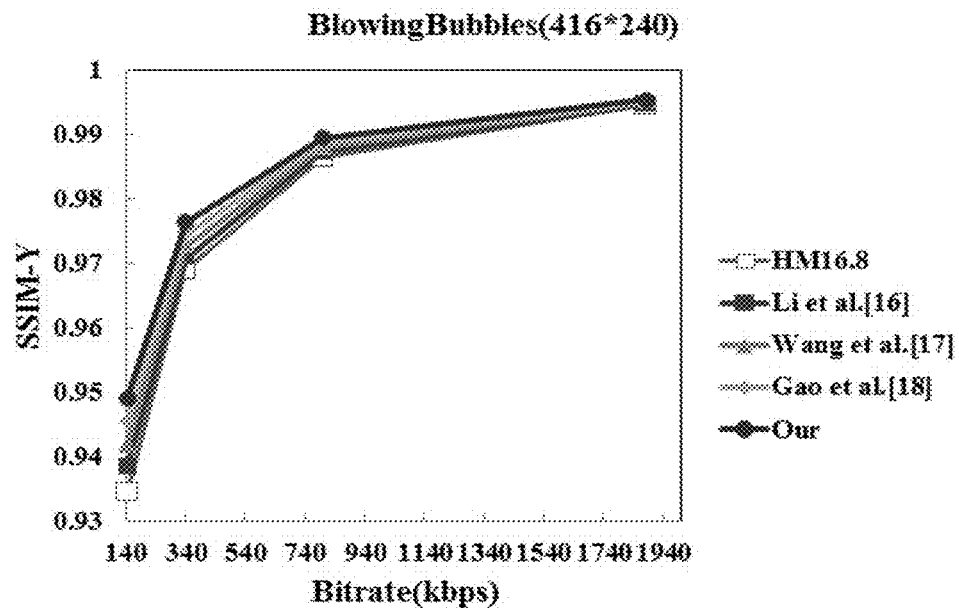
Figure 5D:
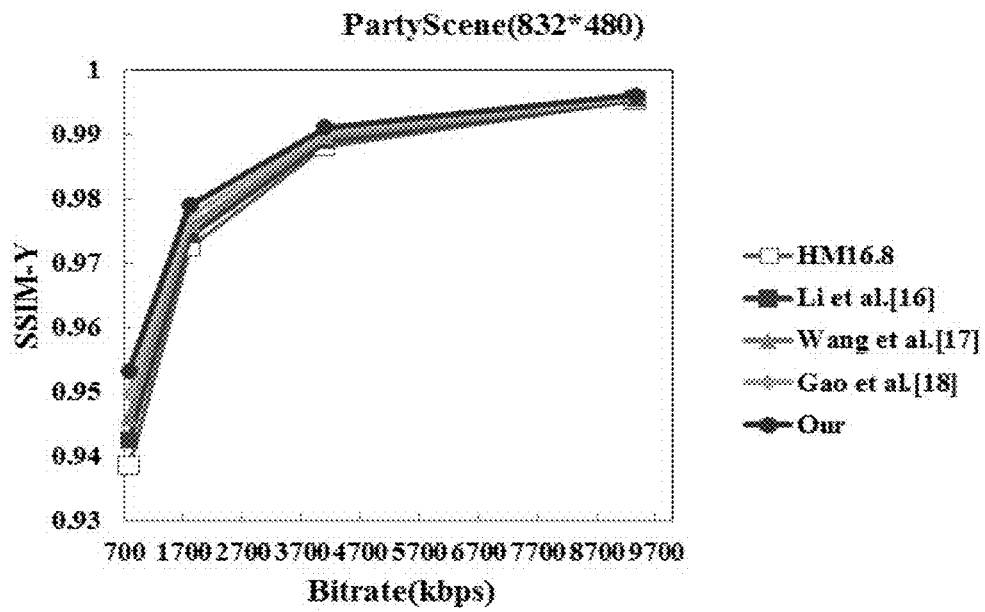

FIGS. 4A-4C show comparison results of the actual and estimated model parameters for the 60-th frame in BQMall (832×480) sequence; the 96-th frame in Keiba(832×480) sequence; and the 200-th frame in Johnny(720p) sequence, respectively. It can be seen the model parameter parameters k can be effectively estimated with the method provided in the present invention.

Experiments have been carried out to compare performance of the RC method provided in the present invention in various aspects with some state-of-the-art RC methods. In the experiments, an LDB coding structure was used and both non-hierarchical (N-Hie) and hierarchical (Hie) encoding were involved.

FIGS. 5A-5D show the overall rate-SSIM performance of the method of the present invention comparing with some state-of-the-art methods disclosed in HM16.8, Li et al. [8], Wang et al. [9] and GAO et al. [11], respectively. It can be seen that the method of the present invention performs better in a wide range of bit rate.

FIGS. 6A-6B shows tables of the bit rate savings of the method of the present invention comparing with HM16.8, Li et al. [8], Wang et al. [9] and GAO et al. [11], under non-hierarchical and hierarchical configurations, respectively. The target bitrates are obtained based on compressing a sequence at fixed QP values set to be 37, 32, 27, and 22, respectively. In comparison with the results of HM16.8, the method of the present invention can achieve 16.3% and 6.5% of average bit rate savings under non-hierarchical and hierarchical configurations, respectively. Moreover, it is observed that the method of the present invention performs better under the non-hierarchical configuration can gain better performance as the hierarchical configuration leaves less room for improvement.

Figure 7A:
Figure 7B:
Figure 7C:
Figure 7D:
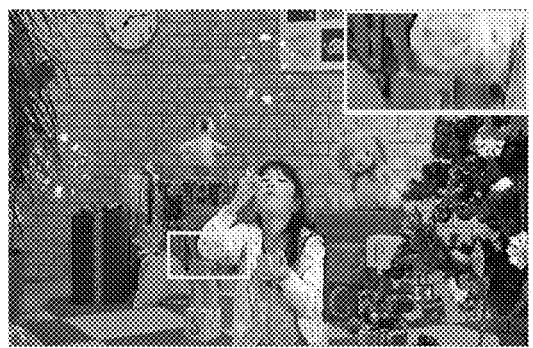
Figure 7E:
Figure 7F:

The visual qualities of a 120-th frame in BQSquare sequence with target bit rate of 160 kbps after being encoded with some state-of-the-art RC methods and the method of the present invention under hierarchical configuration are compared to investigate the subjective quality improvement. FIG. 7A shows the original frame; FIGS. 7B-7E shows frames encoded with the methods of HM16.8 at actual bit rate of 161.11 kbps, Li et al. [8] at actual bit rate of 160.77 kbps, Wang et al. [9] at actual bit rate of 163.77 kbps and Gao et al. [11] at actual bit rate of 161.72 kbps, respectively; and FIG. 7F shows a frame encoded with the method of the present invention at actual bit rate of 160.83 kbps.

Figure 8A:
Figure 8B:
Figure 8C:
Figure 8D:
Figure 8E:
Figure 8F:

Similarly, the visual qualities for a 120-th frame in BQSquare sequence with target bit rate of 780 kbps after being encoded with some state-of-the-art RC methods and the method of the present invention under hierarchical configuration are also compared to investigate the subjective quality improvement. FIG. 8A shows the original framed; FIGS. 8B-8E shows frames encoded with the methods of HM16.8 at actual bit rate of 780.33 kbps, Li et al. [8] at actual bit rate of 780.11 kbps, Wang et al. [9] at actual bit rate of 781.34 kbps and Gao et al. [11] at actual bit rate of 780.95 kbps, respectively; and FIG. 8F shows a frame encoded with the method of the present invention at actual bit rate of 780.17 kbps.

It can be seen that the method of the present invention can produce better visual quality at similar bit rate. Experimental results also show that, compared to the method of the present invention, other state-of-the-art RC methods are more likely to suffer from structural deformation, blocking effects as well as color artifacts, leading to lower visual quality. As a result, the visual quality is obviously degraded. Moreover, the method of the present invention has better quality in the texture areas.

Quality smoothness is another factor influencing the visual quality of experience. FIG. 9 shows a table of experimental results comparing the quality smoothness of frames encoded with some state-of-the-art RC methods and the method of the present invention under N-Hie and Hie configurations, respectively. In the experiment, the standard variance of SSIM, denoted as S_SSIM, is used to evaluate the quality smoothness. From the experimental results, it is observed that Li et al. [8] has the maximum fluctuation. Since Wang et al. [9] and Gao et al. [11] take the frame-coherence into account, they have achieved smoother quality when comparing to Li et al. [8] and HM 16.8. As the accuracy of the frame-coherence is also fully considered in the method of the present invention, minimal fluctuations in terms of S_SSIM, which are 0.0042 and 0.0053 under non-hierarchical and hierarchical configurations, respectively, can be achieved. Therefore, the method of the present invention can ensure quality smoothness compared with other state-of the-art methods based on the parameter inheritance scheme.

Occupancy of buffer is another important factor in rate control, as the overflow and underflow should be avoided. Therefore, stable buffer occupancy is of great importance in evaluating RC performance. The buffer occupancy is mainly determined by the target bits and actual bits and may be indicated with the buffer size, $B_{uf}$ which is defined as:

$$B_{uf} = D_{elay} \times T_{ar} \qquad (17)$$

where $D_{elay}$ is the delay time and $T_{ar}$ is the bandwidth.

Figure 10A:
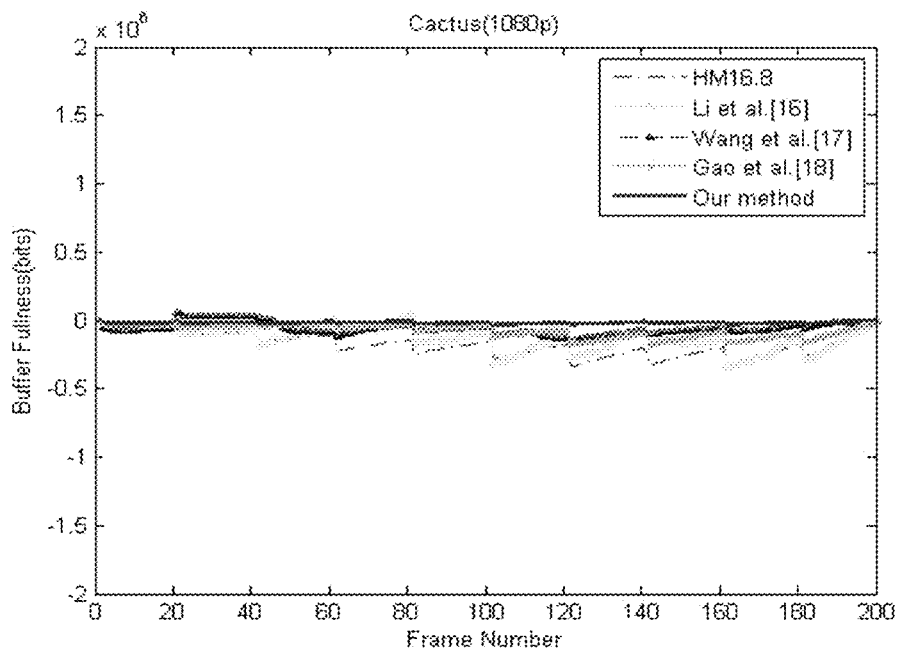
Figure 10B:
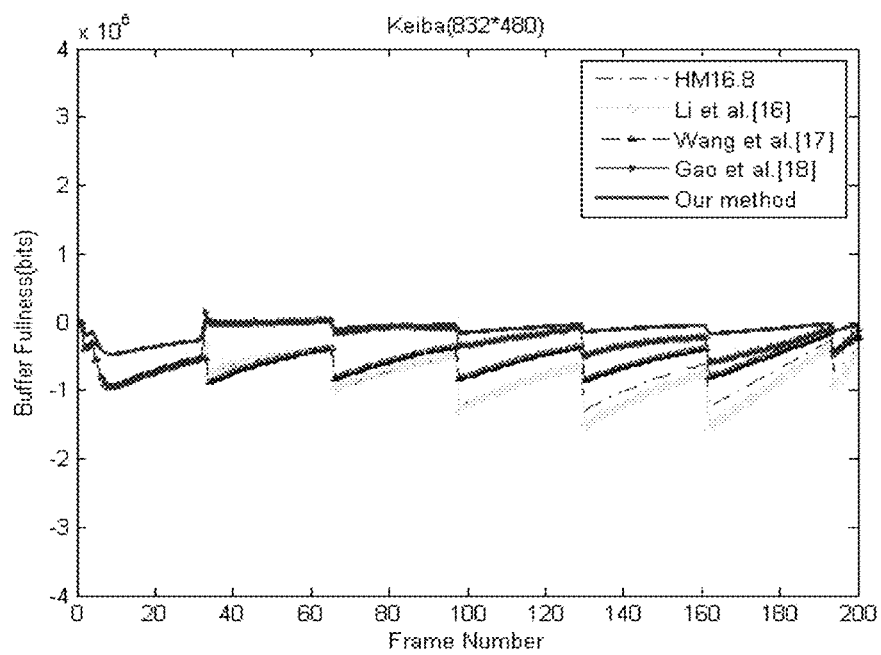

FIGS. 10A-10B show two typical buffer occupancies under hierarchical configuration for the video sequences Catus (1080p) and Keiba (832×480), respectively. It can be seen that, the RC methods of Li et al. [8], Wang et al. [9], Gao et al. [11] and HM16.8, have higher buffer occupancy than the method of the present invention. Generally speaking, the method of the present invention can maintain lower buffer, such that the stalling effects can be prevented for better quality of experience.

The accuracy of the bit rate at the frame level is also investigated for mismatch error, which is calculated as follows, $$Er = \frac{|R_{tar} - R_{act}|}{R_{tar}} \times 100\% \qquad (18)$$

where $R_{act}$ and $R_{tar}$ are the actual bit and the target bit at the frame level.

Figures 11, 12:
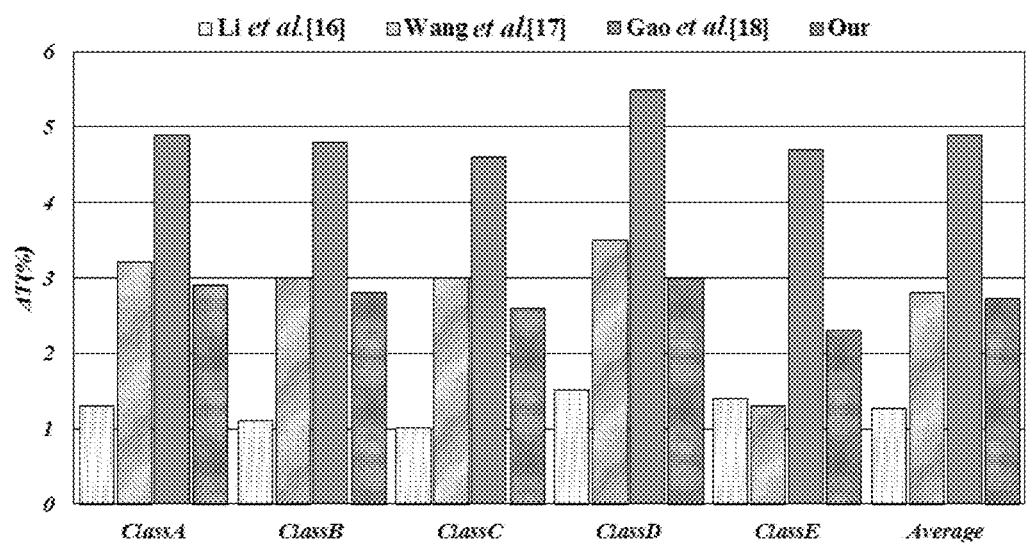
FIG. 11 shows a table of experimental results comparing the frame level RC accuracies among the method of the present invention and some state-of-the-art RC methods.
FIG. 12 shows a bar chart comparing the computation time among the method of the present invention and some state-of-the-art RC methods.
Figure 15:
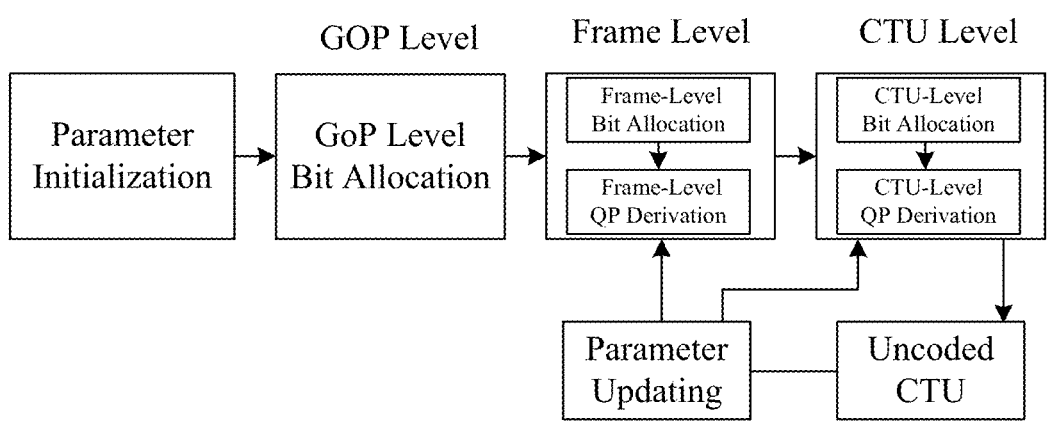
FIG. 15 shows a basic process of rate control (RC) in High Efficiency Video Coding (HEVC).

FIG. 11 shows a table of experimental results comparing the frame level RC accuracies among some state-of-the-art RC methods and the method of the present invention. It can be seen the actual bit rates is very close to the target bit rates for the method of the present invention. When being compared with the methods of Wang et al. [9] and Gao et al. [11], the method of the present invention has higher accuracy. Moreover, although the mismatch error of the method of the present invention is slightly higher than the method of Li et al. [9] and HM16.8, the difference is marginal.

The computational complexities of the method of the present invention and some state-of-the-art RC methods are also compared and evaluated with the computation time of the RC methods which are calculated by:

$$\Delta T = \frac{T_{pro} - T_{org}}{T_{org}} \times 100\% \quad (19)$$

where $T_{pro}$ and $T_{org}$ are the encoding time of the scheme of the present invention and HM16.8 anchor.

FIG. 12 shows a bar chart comparing the computation time of the methods. It can be seen that the method of the present invention is more complex than HM16.8, and the additional complexity of the method of the present invention is close to Wang et al.'s algorithm [9].

The robustness of RC algorithm of the method of the present invention and some state-of-the-art methods under hierarchical configuration are also evaluated and compared on video sequences with dynamic scene changes, including Mobisode, Kimono and Tennis.

FIG. 13 shows a table of R-D performance comparison among these RC methods. It can be seen that the method of the present invention outperforms the state-of-the-art RC methods in term of rate-perceptual distortion. Compared to HM16.8, the method of the present invention can achieve 4.0% bit rate savings on average.

FIG. 14 shows a table of frame level RC accuracy comparison among these RC methods. It shows that the methods of Li et al. [9] and Gao et al. [11] can achieve performance improvement compared to HM16.8 due to the consideration of scene change in frame-level rate control. However, regarding the frame-level bit rate accuracy, the method of the present invention achieves better results than the method of Gao et al. [11], and it is close to the method of Li et al. [9]. The experimental results also imply that the model parameter k can well adapt to the video content when scene change happens, and the method of the present invention is robust for the dynamic scene changed sequences.

The methods based on CTU level rate-distortion optimization for rate control in video coding may be implemented in the apparatus described above and can be incorporated into systems including high definition televisions, mobile or personal computing devices (e.g. "tablet" computer, laptop computer, and personal computer), kiosks, printers, digital cameras, scanners or photocopiers or user terminals having built-in or peripheral electronic displays. The apparatus, including the encoder, may include machine instructions for performing the algorithms; wherein the machine instructions can be executed using general purpose or specialized computing devices, computer processors, or electronic circuitries including, but not limited to, digital signal processors (DSP), application specific integrated circuits (ASIC), field programmable gate arrays (FPGA), and other programmable logic devices. The apparatus may also comprise computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An encoding method in an encoding device using coding tree unit (CTU) level rate-distortion (R-D) optimization for rate control (RC) in video coding, comprising:
   generating, in an encoding device, multiple frames of a received input video in a frame generating module;
   generating, in the coding device, one or more coding tree units from at least one frame of the received input video;
   dividing a frame of the input video into one or more CTUs in a CTU module;
   determining one or more CTU level coding bits through R-D performance optimization, comprising using a divisive normalization framework to characterize a CTU level perceptual distortion (D'(R)), in relation with a CTU level mean square error (MSE) distortion (D(R)), and a divisive normalized factor (f), by:

$D'(R)=D(R)/f^2$, where R is the CTU level coding bit rate; wherein the relationship between the perceptual distortion D'(R) and the bit rate R is depicted with a R-D logarithmic model:

$D'(R)=\ln(c \times R^{-k})$ where c and k are model parameters depending on the video content;
   estimating the model parameters k of the frame on basis of the coding statistics of a previous frame; wherein an optimal value of a parameter $k_j$ for a j-th CTU in the current frame is obtained by minimizing the difference between a true distortion $D_{real}$ of a co-located j-th CTU in the previous frame and an estimated distortion $D_{comp}$ for the j-th CTU of the current frame; and
   generating a video bitstream based on coded video.

2. An encoding method according to claim 1, further comprising:
   dividing each CTU into a number, l, of sub-blocks for Direct Cosine Transform (DCT); and
   obtaining the divisive normalization factor, f, from Structural Similarity (SSIM) index in DCT domain by:

$$f = \frac{\frac{1}{l}\sum_{i=1}^{l}\sqrt{\frac{\sum_{j=1}^{N_L-1}(U_i(j)^2+V_i(j)^2)}{N_L-1}+C_1}}{E\left(\sqrt{\frac{\sum_{j=1}^{N_L-1}(U(j)^2+V(j)^2)}{N_L-1}+C_1}\right)},$$

where E( ) is the expectation operation in the frame, U(j) and V(j) are the DCT coefficients of the input and reconstructed signals, respectively, $U_i(j)$ and $V_i(j)$ are the corresponding j-th DCT coefficient in the i-th sub-block, respectively, $C_l$ is the constant in accordance with the definition of SSIM index, and $N_L$ is the sub-block size.

3. An encoding method according to claim 2, wherein the sub-block size, $N_L$, is set to be 16.

4. An encoding method according to claim 1, wherein the optimization of R-D performance further comprises:

converting a perceptual rate distortion cost function J to:

$$J = \sum_{i=1}^{N} D'(R_i) + \lambda \left( R_C - \sum_{i=1}^{N} R_i \right),$$

where $\lambda$ is the Lagrangian multiplier, $D'(R_i)$ is the perceptual distortion of the i-th CTU with a coding bit rate $R_i$, and N is the number of CTUs in the frame, $R_c$, is the target frame-level coding bit of the current frame of the input video; and determining one or more optimal CTU level coding bit by:

$$R_j = \frac{k_j}{\sum_{i=1}^{N} k_i} R_c,$$

where $R_j$ is the initial CTU level coding bit for the jth CTU in the current frame.

5. An encoding method according to claim 4, wherein the optimization of R-D performance further comprises:

adjusting the one or more optimal CTU level coding bit $R_j^*$ by:

$$R_j^* = R_j \times \omega_a$$

$$\omega_a = \left( 1 - \frac{\sum_{p=1}^{j-1} (R_{act,p} - R_p^*)}{R_c} \right),$$

where $\omega_a$ is an adjustment term to regularize the CTU level coding bit to ensure the frame-level coding bit budget can be met, $R_{act,p}$ and $R_p^*$ are the actual coding bits and the target coding bits after bit allocation, respectively.

6. An encoding method according to claim 1, wherein the difference between $D_{real}$ and $D_{comp}$ is expressed as squared error function, $e^2$, defined as:

$$e^2(D_{real}-D_{comp})^2$$

and the optimal value of k for the j-th CTU the i-th frame, $k_{new}$, is obtained by:

$$k_{new}=k_{old}-\delta(-2(D_{real}-D_{comp}))\ln R,$$

$$=k_{old}+\delta_k(D_{real}-D_{comp})\ln R.$$

where $\delta_k$ is set to be 0.05 and $k_{old}$ is the value of k of the co-located CTU in the previous frame.

7. An encoding method according to claim 1, wherein the true distortion $D_{real}$ is obtained by:

$$D'(R)=D(R)/f^2.$$

8. An encoding method according to claim 1, wherein the estimated distortion $D_{comp}$ for the j-th CTU of the current frame is obtained from the distortion of a co-located j-th CTU in the previously encoded frame.

* * * * *